UNITED STATES PATENT OFFICE.

WILLIAM B. JOHNSON, OF ATLANTA, GEORGIA.

METHOD FOR MAKING BREAD.

1,262,506.   Specification of Letters Patent.   Patented Apr. 9, 1918.

No Drawing.   Application filed January 12, 1918.   Serial No. 211,576.

*To all whom it may concern:*

Be it known that I, WILLIAM B. JOHNSON, a citizen of the United States of America, and a resident of Atlanta, county of Fulton, and State of Georgia, have invented certain new and useful Improvements in Methods for Making Bread, of which the following is a full and clear specification.

It is a known fact that the introduction of new corn-flour into the ordinary wheat dough-batch diminishes the lasting qualities of the bread made therefrom. It is one of the objects of this invention to introduce into the ordinary leavened dough-batch a certain per cent. of corn without incurring any of the objections heretofore prevalent when corn and wheat were mixed. It is also an object of my invention to utilize the corn content to produce bread which will hold its freshness a greater length of time than any I am aware of.

The corn is introduced into the dough-batch in the form of a gelatinized starch. I have found it preferable to prepare this gelatinized starch by steaming corn—preferably the hearts—until it becomes gelatinized and then drying the same to a powder. Corn hearts contain a high per cent. of oil and I have found that by the addition of corn in the form of gelatinized starch to the dough-batch, at least one-half of the shortening usually required in the dough-batch may be eliminated, the oil in the corn replacing such shortening.

Before introducing the gelatinized starch into the dough-batch, I admix therewith a certain per cent. of malted barley and cane sugar. These three ingredients are mixed in a powdered form and added to the all-wheat-flour during the making up of the batch.

By so preparing the corn and mixing therewith the other two ingredients, I am able to substitute for a certain per cent. of the wheat ordinarily used in a dough-batch a mixture a large part of which is corn, and at the same time in no way destroy the quality of the bread but rather improve it in various ways, to be hereinafter more fully described.

One of the advantages resulting from the addition of the above-described mixture to the dough-batch is the promotion of the rising of the dough. The heat created by the fermentation which is stimulated by the introduction of this mixture tends to heat the dough-batch and consequently assist the rising.

Another advantage resulting from the use of my mixture is the elimination of rope or lumpiness from the bread, this being accomplished by the fact that the vigorous fermentation the ingredients set up in the batch develops sufficient diastase to destroy the disease germ which causes this rope or lumpiness.

Another advantage in the use of this mixture is that the gelatinized starch will give sufficient body to weak flour to assist it to rise properly. This is possible because the action of the diastase of the malted barley on the gelatinized starch develops dextrose and dextrin, and the yeast in the dough-batch ferments the dextrose and forms carbon dioxid, while the dextrin, being gummy in nature, tends to make the dough-batch somewhat gummy, thereby retaining the carbon dioxid within the dough-batch. It also retains the moisture within the loaf and thus tends to keep the bread fresh.

By introducing the corn into the wheat dough-batch in the form heretofore described, the early molding usually present when corn and wheat are mixed is eliminated. The bread also retains its freshness and moisture considerably longer owing to the gummy state which the dextrin produces in the dough-batch.

I have found it preferable to mix the ingredients in the following proportions:

60 pounds gelatinized starch,
30 pounds cane sugar.
10 pounds malted barley, 100 pounds.

The amount of this mixture that I add to flour may vary according to the quality of the bread desired, but I have found it desirable to use about fifteen (15) pounds to a barrel of wheat-flour (196 pounds).

From the foregoing, it will be seen that I have provided a mixture containing a large per cent. of corn which can be mixed with wheat-flour without incurring the usual disastrous results, but which acts with the remainder of the dough-batch to produce a better product.

My ingredient has the further advantage that it avoids waste of yeast by holding the gases of fermentation in the dough. Another feature of importance is that the gelatinized corn-starch has a high capacity for absorbing and holding water, thus tending to keep the bread moist and fresh.

The nature and scope of the invention having been thus indicated and its preferred embodiment having been specifically described, what is claimed as new is:

1. A dough-batch ingredient consisting of a powdered mixture of gelatinized corn-starch and malted barley, the gelatinized starch predominating in quantity.

2. In the manufacture of leavened bread, introducing into the leavened dough-batch an ingredient consisting of gelatinized corn-starch and malted barley, the gelatinized starch predominating in quantity.

In testimony whereof I hereunto affix my signature.

WILLIAM B. JOHNSON.